(12) United States Patent
Huang et al.

(10) Patent No.: US 12,031,656 B2
(45) Date of Patent: Jul. 9, 2024

(54) WATER TRANSFERRING DEVICE AND WATER PURIFICATION FAUCET

(71) Applicant: Xiamen Lota International Co., Ltd., Fujian (CN)

(72) Inventors: Qiang Huang, Fujian (CN); Yanyan Wang, Fujian (CN); Junqi Zhang, Fujian (CN); Chuanbao Zhu, Fujian (CN)

(73) Assignee: Xiamen Lota International Co., Ltd., Fujian (CN)

( * ) Notice: Subject to any disclaimer, the term of this patent is extended or adjusted under 35 U.S.C. 154(b) by 114 days.

(21) Appl. No.: 17/887,720

(22) Filed: Aug. 15, 2022

(65) Prior Publication Data

US 2023/0288006 A1    Sep. 14, 2023

(30) Foreign Application Priority Data

Mar. 8, 2022   (CN) .......................... 202220503433.9

(51) Int. Cl.
*F16L 39/04*   (2006.01)
*E03C 1/02*    (2006.01)

(52) U.S. Cl.
CPC .............. *F16L 39/04* (2013.01); *E03C 1/021* (2013.01); *E03C 2201/40* (2013.01)

(58) Field of Classification Search
CPC ......... F16L 39/00; F16L 39/005; F16L 39/02; F16L 39/04; F16L 39/06; E03C 1/021; E03C 1/046; E03C 1/1222; E03C 2201/40
USPC ...................................... 4/675–678
See application file for complete search history.

(56) References Cited

U.S. PATENT DOCUMENTS 3,566,915 A * 3/1971 Griffin .................... F16L 39/00
137/561 A

* cited by examiner

*Primary Examiner* — Aaron M Dunwoody
(74) *Attorney, Agent, or Firm* — Cooper Legal Group LLC

(57) ABSTRACT

A water transferring device is provided and comprises a body having a water passage chamber, a first water inlet joint having a first water inlet passage and connected to the body, and a water outlet joint having an outer water passage and an inner water passage. The first water inlet joint and the water outlet joint enable the inner water passage to be in communication with the first water inlet passage. The water passage chamber is in communication with the outer water passage. At least one of the first water inlet joint or the water outlet joint comprises a connection structure connected to the body and enabling the at least one of the first water inlet joint or the water outlet joint to be at least rotated for a specific angle around an axis of the at least one of the first water inlet joint or the water outlet joint.

20 Claims, 4 Drawing Sheets

WATER TRANSFERRING DEVICE AND WATER PURIFICATION FAUCET

RELATED APPLICATIONS

This application claims priority to Chinese patent application number 202220503433.9, filed on Mar. 8, 2022. Chinese patent application number 202220503433.9 is incorporated herein by reference.

FIELD OF THE DISCLOSURE

The present disclosure relates to the field of sanitary products, and in particular to a water transferring device and a water purification faucet.

BACKGROUND OF THE DISCLOSURE

In recent years, more and more users use a water purifier in their homes, and most of the users mount the water purifier independently, so that the number of pipelines is increased. Additionally, the water purifier is difficult to arrange when the users mount the water purifier. There exists in the prior art techniques for making a purified water pipeline and a water supply line that are integrated, and the integrated structure in the prior art makes the purified water pipeline and the water supply line converge on and flow to a double-layer tube body through a water transferring head. The double-layer tube body is connected on a double-layer joint of the water transferring head. During installation and subsequent use, the double-layer tube body connected with the water transferring head may move because the double-layer tube body and the water transferring head are fixedly connected through threaded connections, which may easily cause the double-layer tube body to rotate relative to the water transferring head to cause the double-layer tube body to fall off.

BRIEF SUMMARY OF THE DISCLOSURE

The present disclosure provides a water transferring device and a water purification faucet to solve the deficiencies in the background.

In order to solve the technical problem, a water transferring device is provided and comprises a body, a first water inlet joint, and a water outlet joint. The water outlet joint comprises an outer water passage and an inner water passage extending inside the outer water passage. The first water inlet joint comprises a first water inlet passage. The body comprises a water passage chamber. The first water inlet joint is connected to the body. The first water inlet joint and the water outlet joint are connected to each other to enable the inner water passage to be in communication with the first water inlet passage. The water passage chamber is in communication with the outer water passage. At least one of the first water inlet joint or the water outlet joint comprises a connection structure connected to the body. The connection structure is configured to enable the at least one of the first water inlet joint or the water outlet joint to be at least rotated for a specific angle around an own axis of the at least one of the first water inlet joint or the water outlet joint.

In a preferred embodiment, the connection structure comprises a groove formed on at least one of the first water inlet joint or the water outlet joint. The groove extends for a specific distance along at least one of a rotation direction of the first water inlet joint or a rotation direction of the water outlet joint. The connection structure further comprises at least one clamping plate. The at least one clamping plate is clamped to the groove and the body to inhibit movement of the at least one of the first water inlet joint or the water outlet joint along the own axis of the at least one of the first water inlet joint or the water outlet joint.

In a preferred embodiment, the water outlet joint comprises an inner joint defining the inner water passage, and the inner joint is disposed at least partially in the first water inlet passage.

In a preferred embodiment, the groove is defined on the first water inlet joint, the water outlet joint is fixedly connected to the first water inlet joint, and the first water inlet joint is rotatably connected to the body.

In a preferred embodiment, the groove extends for a circle along the at least one of the rotation direction of the first water inlet joint or a rotation direction of the water outlet joint.

In a preferred embodiment, the at least one clamping plate comprises two clamping arms spaced apart from each other. Two sides of the body comprises two through-hole slots corresponding to the groove. The two clamping arms are configured to move respectively into the through-hole slots to be clamped to the groove.

In a preferred embodiment, the water transferring device further comprises a second water inlet joint. The second water inlet joint comprises a second water inlet passage. The second water inlet joint is connected to the body to enable the second water inlet passage to be in communication with the water passage chamber.

In a preferred embodiment, the second water inlet joint is connected to the body through a buckle structure.

The present disclosure further provides a water purification faucet comprising the water transferring device. The first water inlet passage is configured to receive purified water, and the water passage chamber is configured to receive running water.

In a preferred embodiment, the water purification faucet comprises a faucet body and a water purifier, the faucet body is in communication with the water outlet joint, and the first water inlet passage is communication with the water purifier.

Compared with the existing techniques, the technical solution has the following advantages.

The water transferring device is provided and comprises the body, the first water inlet joint, and the water outlet joint. The water outlet joint comprises the outer water passage and the inner water passage extending inside the outer water passage. The first water inlet joint comprises the first water inlet passage. The body comprises the water passage chamber. The first water inlet joint is connected to the body. The first water inlet joint and the water outlet joint are connected to each other to enable the inner water passage to be in communication with the first water inlet passage. The water passage chamber is in communication with the outer water passage. The at least one of the first water inlet joint or the water outlet joint comprises the connection structure connected to the body. The connection structure is configured to enable at least one of the first water inlet joint or the water outlet joint to be at least rotated for the specific angle around an axis of the at least one of the first water inlet joint or the water outlet joint. During use, the problem of the body easily falling off due to the use of threaded connections is avoided.

DETAILED DESCRIPTION OF THE EMBODIMENTS

The present disclosure will be further described below in combination with the accompanying drawings and embodiments.

Figure 1:
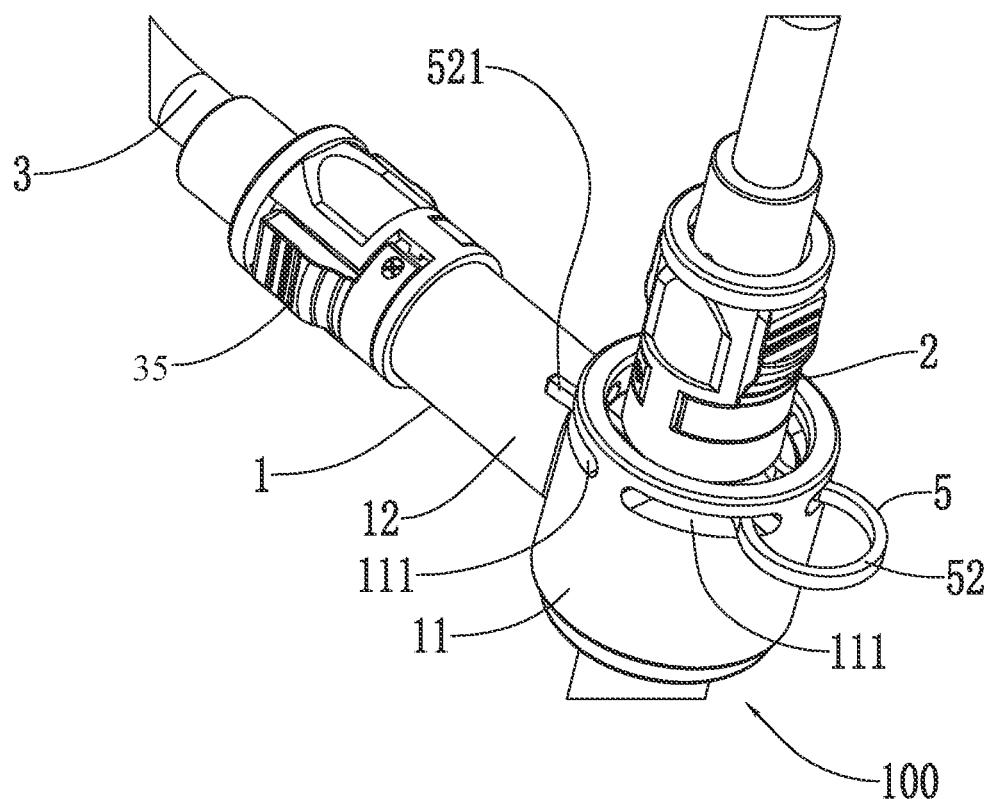
FIG. 1 illustrates a perspective view of a water transferring device of a preferred embodiment in the present disclosure.
Figure 2:
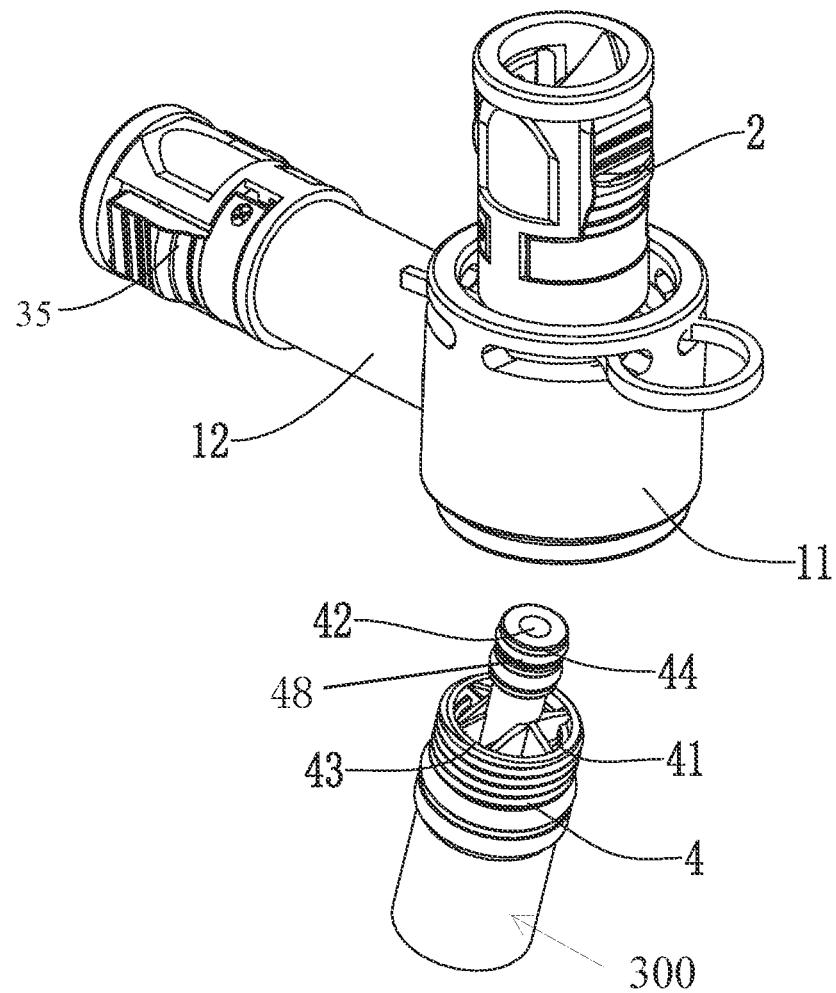
FIG. 2 illustrates a perspective exploded view of the water transferring device of a preferred embodiment in the present disclosure.
Figure 3:
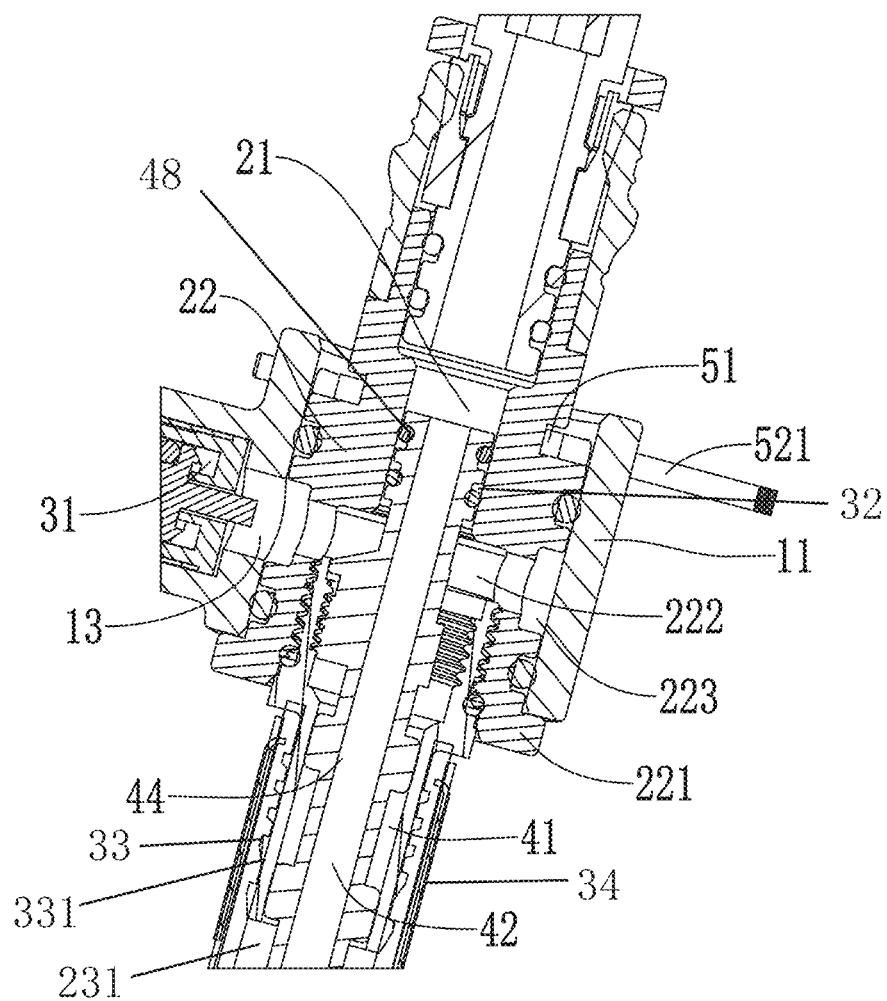
FIG. 3 illustrates a cross-sectional view of the water transferring device of a preferred embodiment in the present disclosure.

Referring to FIGS. 1-3, a water transferring device 100 comprises a body 1, a first water inlet joint 2, and a water outlet joint 4. The body 1 comprises a shaft sleeve 11 and a side shaft sleeve 12 connected to a side wall of the shaft sleeve 11. The shaft sleeve 11 and the side shaft sleeve 12 are connected together at a certain angle. In this embodiment, the shaft sleeve 11 and the side shaft sleeve 12 are connected together at 90 degrees. The shaft sleeve 11 has a middle-through structure and comprises a middle passage, and the side shaft sleeve 12 has a middle-through structure and comprises a side passage. The middle passage and the side passage are connected together to form a water passage chamber 13 at a junction of the middle passage and the side passage.

The water outlet joint 4 comprises an outer water passage 41 and an inner water passage 42 extending inside the outer water passage 41. The first water inlet joint 2 comprises a first water inlet passage 21. The body 1 comprises the water passage chamber 13, and the first water inlet joint 2 is connected to the body 1. The first water inlet joint 2 and the water outlet joint 4 are connected to each other to enable the inner water passage 42 to be in communication with the first water inlet passage 21. The water passage chamber 13 is in communication with the outer water passage 41. At least one of the first water inlet joint 2 or the water outlet joint 4 comprises a connection structure 5 connected to the body 1, and the connection structure 5 is configured to enable at least one of the first water inlet joint 2 or the water outlet joint 4 to be at least rotated for a certain angle around its own axis. That is, at least one of the first water inlet joint 2 or the water outlet joint 4 can be rotated for a certain angle around an axis of the at least one of the first water inlet joint 2 or the water outlet joint 4, so that a problem of the body 1 easily falling off due to the use of threaded connections can be avoided during use.

The connection structure 5 comprises a groove 51 formed on at least one of the first water inlet joint 2 or the water outlet joint 4, and the groove 51 extends for a certain distance along at least one of a rotation direction of the first water inlet joint 2 or a rotation direction of the water outlet joint 4. The connection structure 5 further comprises at least one clamping plate 52, and the at least one clamping plate 52 is clamped to the groove 51 and the body 1 to inhibit movement of at least one of the first water inlet joint 2 or the water outlet joint 4 along an axis of the at least one of the first water inlet joint 2 or the water outlet joint 4.

In this embodiment, the groove 51 is formed on the first water inlet joint 2, and the water outlet joint 4 is fixedly connected to the first water inlet joint 2. The first water inlet joint 2 is rotatably connected on the body 1. Moreover, as mentioned above, the groove 51 can also be formed on the water outlet joint 4. The first water inlet joint 2 is fixedly connected to the water outlet joint 4, and the water outlet joint 4 is rotatably connected on the body 1. Alternatively, each of the first water inlet joint 2 and the water outlet joint 4 has the connection structure 5, each of the first water inlet joint 2 and the water outlet joint 4 is rotatably connected to the body 1, and the first water inlet joint 2 and the water outlet joint 4 are arranged coaxially, so that the first water inlet joint 2 and the water outlet joint 4 can rotate relative to each other.

In this embodiment, the water outlet joint 4 comprises an outer joint 43 and an inner joint 44 disposed in the outer joint 43. The inner joint 44 comprises the inner water passage 42, and a gap between the outer joint 43 and the inner joint 44 defines the outer water passage 41. A first end of the water outlet joint 4 can be connected to a double-layer pipe 230 so that an inner pipe body and an outer pipe body of the double-layer pipe 230 are respectively connected to the inner water passage 42 and the outer water passage 41. In this embodiment, a distal end of the inner joint 44 extends beyond a distal end of the outer joint 43 for a certain distance, and the distal end of the outer joint 43 comprises external threads.

The first water inlet joint 2 includes a rotation shaft body 22, and a distal end of the rotation shaft body 22 comprises a position-limiting ring block 221. The rotation shaft body 22 comprises a rotation shaft chamber 222, and a peripheral wall of the rotation shaft body 22 comprises an annular cavity 223 recessed radially inwardly. The annular cavity 223 is in communication with the rotation shaft chamber 222. The first water inlet joint 2 further comprises the first water inlet passage 21. During installation, the rotation shaft body 22 is inserted into the middle passage, and the position-limiting ring block 221 abuts a first end of the shaft sleeve 11 to inhibit axial movement of the rotation shaft body 22. The rotation shaft body 22 is rotatably disposed in the middle passage, and the annular cavity 223 corresponds to the water passage chamber 13 to enable the water passage chamber 13 to be constantly in communication with the rotation shaft chamber 222 when the rotation shaft body 22 rotates. An inner wall of the rotation shaft chamber 222 comprises inner threads, and the outer joint 43 is connected to the rotation shaft body 22 through the inner threads and the external threads. When the outer joint 43 is screwed to the rotation shaft body 22, the distal end of the inner joint 44 is inserted into the first water inlet passage 21.

In this embodiment, the groove 51 extends for a circle along a rotation direction of the rotation shaft body 22 of the first water inlet joint 2, so that the first water inlet joint 2 can rotate 360 degrees. In this embodiment, the at least one clamping plate 52 comprises two clamping arms 521 spaced apart from each other, and two sides of the body 1 comprise two through-hole slots 111 corresponding to the groove 51. The two clamping arms 521 move respectively into the through-hole slots 111 to be clamped to the groove 51.

The water transferring device 100 further comprises a second water inlet joint 3, and the second water inlet joint 3 comprises a second water inlet passage 31. The second water inlet joint 3 is connected to the body 1 to enable the second water inlet passage 31 to be in communication with the water passage chamber 13. In this embodiment, the second water inlet joint 3 is connected to the side shaft sleeve 12 of the body 1 through a buckle structure 35.

When assembling the water transferring device 100, the rotation shaft body 22 is first mounted from the first end of the shaft sleeve 11 until the position-limiting ring block 221 abuts the first end of the shaft sleeve 11. The at least one clamping plate 52 is inserted into the two through-hole slots 111 to correspondingly be clamped in the groove 51. At this time, the axial movement of the rotation shaft body 22 is inhibited, and the rotation shaft body 22 can rotate in a circumferential direction of the shaft sleeve 11. The water outlet joint 4 is screwed to the rotation shaft body 22, and at this time, the inner joint 44 is inserted into the first water inlet passage 21. The second water inlet joint 3 is connected to the side shaft sleeve 12 through the buckle structure 35.

Figure 4:
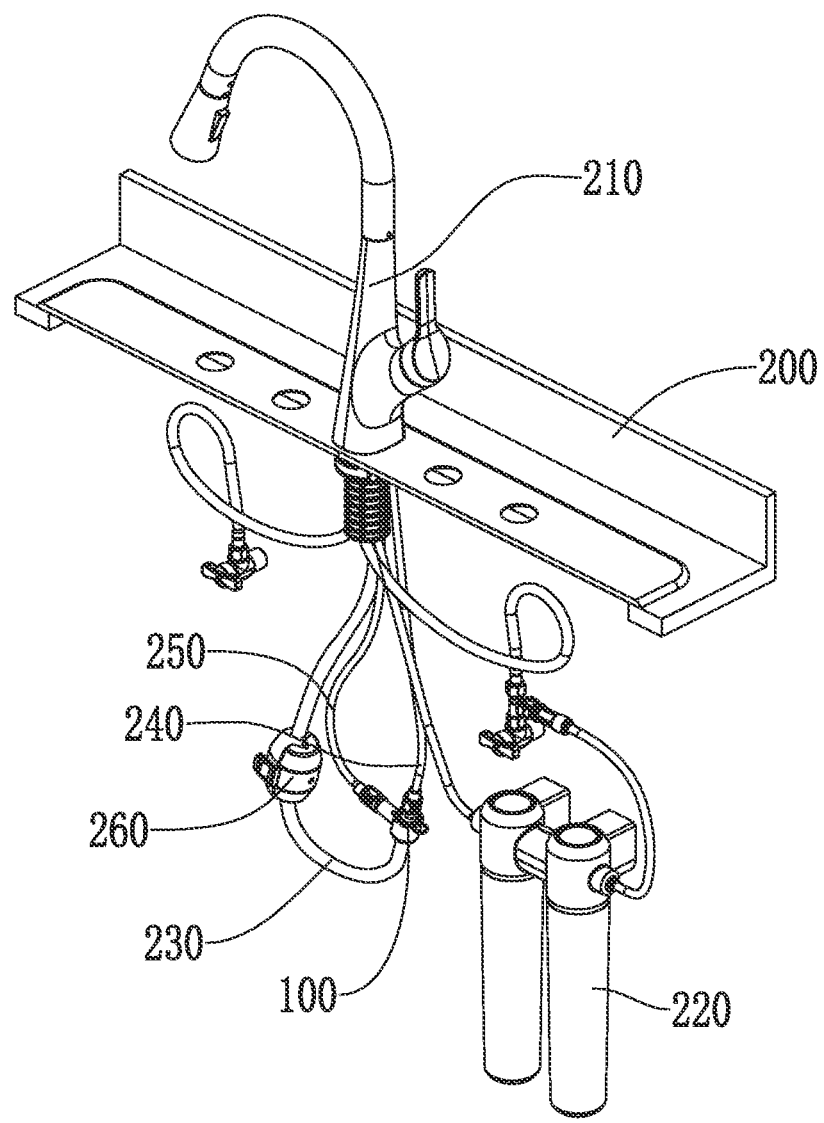
FIG. 4 illustrates a perspective view of a water purification faucet of a preferred embodiment in the present disclosure.

Referring to FIG. 4, the present disclosure further provides a water purification faucet 200. The water purification faucet 200 comprises the water transferring device 100. The water purification faucet 200 comprises a faucet body 210, a water purifier 220, and the double-layer pipe 230. The water purification faucet 200 further comprises a water purification pipe 240 connected to the first water inlet joint 2 and a running water pipe 250 connected to the second water inlet joint 3. The faucet body 210 of the water purification faucet 200 is disposed on a countertop such as a wash basin, and a valve core is disposed in the faucet body 210. The valve core is connected with cold water and hot water to form mixed water that is in communication with the running water pipe 250. The water purifier 220 forms purified water that is provided to the first water inlet joint 2 through the water purification pipe 240. The water purification faucet 200 can be a pull-out faucet, and the double-layer pipe 230 can be sleeved with a weight 260.

The water purification faucet 200 further comprises a tube-in-tube structure 300, and the tube-in-tube structure 300 comprises the double-layer pipe 230 and the water outlet joint 4. One end of the double-layer pipe 230 is connected with the water outlet joint 4. A water passage 231 is defined between the outer pipe body and the inner pipe body, and the water passage 231 is in communication with the water outlet joint 4. An inner end of the inner joint 44 is sealingly disposed in an end of the inner pipe body. Specifically, the inner end of the inner joint 44 is tightly inserted into the end of the inner pipe body. An outer end of the inner joint 44 is sleeved with a sealing ring 48 sealingly connected between the outer end of the inner joint 44 and an inner peripheral wall of the first water inlet passage 21, and the outer end of the inner joint 44 comprises an annular groove 32 for receiving the sealing ring 48. An outer peripheral wall of the outer joint 43 is sleeved with the outer pipe body.

An inner side of the outer peripheral wall of the outer joint 43 comprises at least one positioning ring 33 for preventing the outer pipe body from being released, and the outer pipe body is sleeved on the inner side of the outer peripheral wall of the outer joint 43. The at least one positioning ring 33 comprises an inclined surface 331 facing the inner pipe body. The inclined surface 331 defines a reverse hook. When the inner side of the outer peripheral wall of the outer joint 43 is inserted into the outer pipe body, an inner peripheral wall of the outer pipe body slides on the inclined surface 331. When the outer joint 43 is being pulled, the reverse hook is fixedly hooked on the inner peripheral wall of the outer pipe body to prevent the outer pipe body from being released.

An outer side of the outer pipe body is disposed with a pressing sleeve 34 configured for applying a pressure onto the outer pipe body to enable the outer pipe body to be fixedly connected to the at least one positioning ring 33. In this embodiment, the pressing sleeve 34 is made of metal.

An outer side of the outer peripheral wall of the outer joint 43 comprises the external threads for connection to the rotation shaft body 22.

The aforementioned embodiments are merely some embodiments of the present disclosure, and the scope of the disclosure is not limited thereto. Thus, it is intended that the present disclosure cover any modifications and variations of the presently presented embodiments provided they are made without departing from the appended claims and the specification of the present disclosure.

What is claimed is:
1. A water transferring device, comprising:
   a body,
   a first water inlet joint, and
   a water outlet joint, wherein:
      the water outlet joint comprises an outer water passage and an inner water passage extending inside the outer water passage,
      the first water inlet joint comprises a first water inlet passage,
      the body comprises a water passage chamber,
      the first water inlet joint is connected to the body,
      the first water inlet joint and the water outlet joint are connected to each other to enable the inner water passage to be in communication with the first water inlet passage,
      the water passage chamber is in communication with the outer water passage,
      at least one of the first water inlet joint or the water outlet joint comprises a connection structure connected to the body,
      the connection structure is configured to enable the at least one of the first water inlet joint or the water outlet joint to be at least rotated by a first angle around an axis of the at least one of the first water inlet joint or the water outlet joint,
      the connection structure comprises a groove formed on the at least one of the first water inlet joint or the water outlet joint,
      the groove extends along at least one of a rotation direction of the first water inlet joint or a rotation direction of the water outlet joint,
      the connection structure further comprises at least one clamping plate, and
      the at least one clamping plate is clamped to the groove and the body to inhibit movement of the at least one of the first water inlet joint or the water outlet joint along the axis of the at least one of the first water inlet joint or the water outlet joint.
2. The water transferring device according to claim 1, wherein:
   the water outlet joint comprises an inner joint defining the inner water passage, and
   the inner joint is disposed at least partially in the first water inlet passage.
3. The water transferring device according to claim 2, wherein:
   the groove is defined on the first water inlet joint,
   the water outlet joint is fixedly connected to the first water inlet joint, and
   the first water inlet joint is rotatably connected to the body.
4. The water transferring device according to claim 1, wherein:
   the groove is defined on the first water inlet joint,
   the water outlet joint is fixedly connected to the first water inlet joint, and
   the first water inlet joint is rotatably connected to the body.

5. The water transferring device according to claim 1, wherein:
the groove forms a circle.

6. The water transferring device according to claim 5, wherein:
the at least one clamping plate comprises two clamping arms spaced apart from each other,
two sides of the body comprise two through-hole slots corresponding to the groove, and
the two clamping arms are configured to move respectively into the two through-hole slots to be clamped to the groove.

7. The water transferring device according to claim 1, wherein:
the water transferring device further comprises a second water inlet joint,
the second water inlet joint comprises a second water inlet passage, and
the second water inlet joint is connected to the body to enable the second water inlet passage to be in communication with the water passage chamber.

8. The water transferring device according to claim 7, wherein:
the second water inlet joint is connected to the body through a buckle structure.

9. A water purification faucet, comprising a water transferring device, wherein:
the water transferring device comprises a body, a first water inlet joint, and a water outlet joint,
the water outlet joint comprises an outer water passage and an inner water passage extending inside the outer water passage,
the first water inlet joint comprises a first water inlet passage,
the body comprises a water passage chamber,
the first water inlet joint is connected to the body,
the first water inlet joint and the water outlet joint are connected to each other to enable the inner water passage to be in communication with the first water inlet passage,
the water passage chamber is in communication with the outer water passage,
at least one of the first water inlet joint or the water outlet joint comprises a connection structure connected to the body,
the connection structure is configured to enable the at least one of the first water inlet joint or the water outlet joint to be at least rotated by a first angle around an axis of the at least one of the first water inlet joint or the water outlet joint,
the first water inlet passage is configured receive purified water, and
the water passage chamber is configured to receive running water.

10. The water purification faucet according to claim 9, wherein:
the water purification faucet comprises a faucet body and a water purifier,
the faucet body is in communication with the water outlet joint, and
the first water inlet passage is communication with the water purifier.

11. The water purification faucet according to claim 9, wherein:
the water purification faucet further comprises a tube-in-tube structure,
the tube-in-tube structure comprises a double-layer pipe and the water outlet joint,
one end of the double-layer pipe is connected with the water outlet joint,
the double-layer pipe comprises an outer pipe body and an inner pipe body extending in the outer pipe body,
a water passage is defined between the outer pipe body and the inner pipe body,
an inner end of an inner joint of the water outlet joint is sealingly disposed in an end of the inner pipe body,
an outer end of the inner joint is sleeved with a sealing ring sealingly connected between the outer end of the inner joint and an inner peripheral wall of the first water inlet passage, and
an outer peripheral wall of an outer joint of the water outlet joint is sleeved with the outer pipe body.

12. The water purification faucet according to claim 11, wherein:
an inner side of the outer peripheral wall of the outer joint comprises at least one positioning ring for preventing the outer pipe body from being released, and
the at least one positioning ring comprises an inclined surface facing the inner pipe body.

13. The water purification faucet according to claim 12, wherein:
an outer side of the outer pipe body is disposed with a pressing sleeve configured for applying a pressure onto the outer pipe body to enable the outer pipe body to be fixedly connected to the at least one positioning ring.

14. The water purification faucet according to claim 11, wherein:
an outer side of the outer peripheral wall of the outer joint comprises external threads.

15. The water transferring device according to claim 9, wherein:
the connection structure comprises a groove formed on the at least one of the first water inlet joint or the water outlet joint,
the groove extends along at least one of a rotation direction of the first water inlet joint or a rotation direction of the water outlet joint,
the connection structure further comprises at least one clamping plate, and
the at least one clamping plate is clamped to the groove and the body to inhibit movement of the at least one of the first water inlet joint or the water outlet joint along the axis of the at least one of the first water inlet joint or the water outlet joint.

16. The water transferring device according to claim 15, wherein:
the water outlet joint comprises an inner joint defining the inner water passage, and
the inner joint is disposed at least partially in the first water inlet passage.

17. The water transferring device according to claim 15, wherein:
a groove is defined on the first water inlet joint,
the water outlet joint is fixedly connected to the first water inlet joint, and
the first water inlet joint is rotatably connected to the body.

18. The water transferring device according to claim 15, wherein:
the groove forms a circle.

19. The water transferring device according to claim 18, wherein:

the at least one clamping plate comprises two clamping arms spaced apart from each other, two sides of the body comprise two through-hole slots corresponding to the groove, and the two clamping arms are configured to move respectively into the two through-hole slots to be clamped to the groove.

20. The water transferring device according to claim 9, wherein:

the water transferring device further comprises a second water inlet joint, the second water inlet joint comprises a second water inlet passage, and the second water inlet joint is connected to the body to enable the second water inlet passage to be in communication with the water passage chamber.

\* \* \* \* \*